April 17, 1928.
A. P. HOLDEN ET AL
METHOD OF AND MEANS FOR BURNING OIL
Filed March 19, 1926
1,666,207
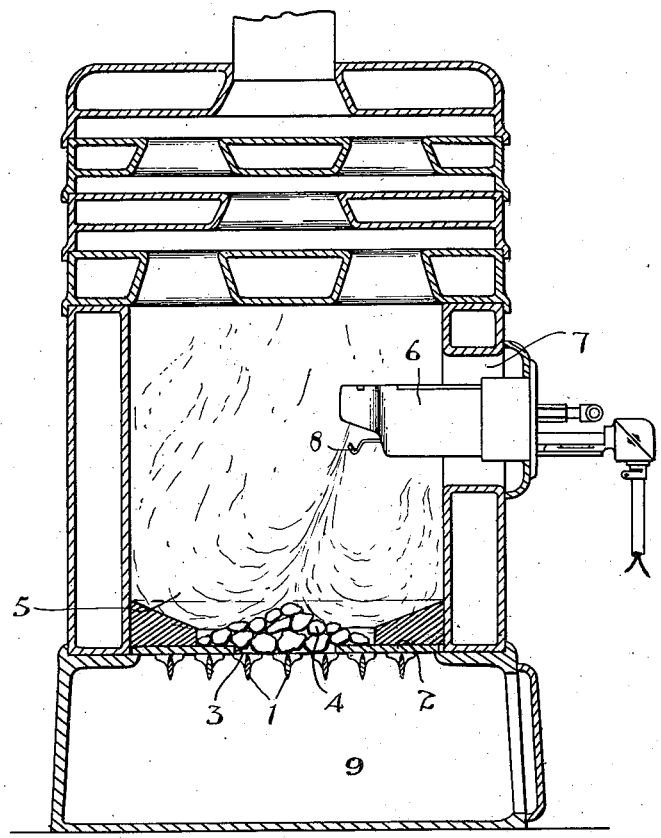
Inventors.
Arthur P. Holden
Philip Morgan Patented Apr. 17, 1928.

1,666,207

UNITED STATES PATENT OFFICE.

ARTHUR P. HOLDEN AND PHILIP MORGAN, OF TORONTO, ONTARIO, CANADA.

METHOD OF AND MEANS FOR BURNING OIL.

Application filed March 19, 1926. Serial No. 96,073.

The principal objects of the invention are, to effect the thorough gasification of the oil and to mix with the gas thus produced the maximum quantity of air to effect complete combustion, thereby obtaining the maximum heat value from the oil.

The principal features of the invention consist in atomizing the oil with air in a suitable manner and directing the oil vapor so produced downwardly against a concentrated stream of air which is heated by and directed through a mass of incandescent material into a firebox.

The drawing represents a vertical sectional view of a furnace showing the application of the invention thereto.

The burning of oil for heating purposes is an extremely old art and many methods and structures of devices have been used to obtain more or less improved results.

It has been commonly known to provide in the furnace a bed of refractory material which becomes incandescent and such refractory material has been so disposed that there will be a circulation of air therethrough.

It has also been known to preheat air to be used in atomizing the oil and to mix oil with steam and to project the atomized oil over the surface of the incandescent refractory body.

The present invention differs from the prior practices, in that the passage of air through the refractory body is confined to a restricted area substantially centrally of the fire-box and the refractory material is so arranged that all air entering the fire-box through the said passage must pass between the refractory particles. Further, the atomized oil is directed downwardly to impinge upon the refractory mass and to meet and be thoroughly mixed with the heated inflowing air.

As shown in the accompanying drawing the grate bars 1 are covered by a plate 2 which has a central opening 3 therethrough, said plate covering the major portion of the area of the grate.

A mass of refractory material 4 is piled over the opening 3, thus all air flowing into the fire-box 5 from the bottom will flow through the opening 3 and consequently pass through the refractory mass.

An atomizing device 6 is supported in the fire door opening 7 to project into the fire-box 5 at a point adjacent to the top.

This device may be of any suitable construction and is preferably devised to preheat the air flowing thereinto which is used in atomizing the oil. The atomized oil and primary air are directed from the atomizer 6 in a downward direction toward the opening 3 and its covering mass of refractory material.

Suitable means 8 is provided for igniting the atomized oil flowing from the atomizer and the oil vapor is directed against the bed of refractory material very rapidly heating same to incandescence.

When this mass has been brought to an incandescent state the ignition device may be cut off and the stream of oil vapor flowing from the atomizer 6 will be expanded in the surrounding temperature of the fire-box and ignited by contact therewith and any particles of oil projected as far from the atomizer as the refractory bed will be broken up by contact therewith.

The furnace draft draws a supply of air through the refractory material 4 from below the grate bars and as the only entrance to the fire-box 5 is through the opening 3, the secondary air flowing into the fire-box must pass through the incandescent refractory mass and be preheated before mixing with the burning oil vapor projected directly thereagainst.

The result is that the inflowing stream of hot air is met centrally of the fire-box with a stream of atomized oil and this results in the maximum vaporization of the oil and therefore ensures the complete combustion of all particles of the oil and consequently of the greatest quantity of oxygen.

The downwardly directed stream of atomized oil being met by the upwardly flowing stream of air drawn by the natural draft of the furnace through the central opening at the bottom of the combustion chamber produces the effect of spreading the flame outwardly from the center as illustrated in the drawing, so that the flame strikes against the walls of the combustion chamber at the lowest point thereof thereby applying the heat to practically the entire surface of the heat exchanging walls with extraordinary efficiency.

It must also be understood that nothing is claimed in this application in respect to the special structure of the atomizer or broadly in the preheating of the atomizing primary air.

What we claim as our invention is:—

1. A method of burning oil consisting in directing a stream of atomized oil downwardly into a fire-box and igniting the same, and directing a concentrated stream of preheated air upwardly to meet and spread the downwardly directed flame laterally outward in all directions.

2. A method of burning oil consisting in projecting atomized oil into a combustion chamber, atomizing the oil with preheated air, directing the preheated atomized oil in a downward stream, igniting the atomized oil, directing a concentrated stream of air upwardly to meet and spread the downwardly directed flame outwardly in all directions.

3. A method of burning oil consisting in projecting atomized oil into a combustion chamber, directing the atomized oil in a downward stream, igniting the atomized oil, directing a concentrated stream of air upwardly to meet and spread the downwardly directed flame outwardly in all directions, and preheating the upwardly directed stream of air.

4. A method of burning oil consisting in directing a stream of atomized oil downwardly into a fire-box and igniting same, and directing a concentrated stream of air upwardly to meet and spread the downwardly directed flame laterally outward in all directions.

5. Means for burning oil, comprising a fire-box having a flue at the top and having a bottom provided with a central opening of less diameter than the firebox for the admission of air, and an oil atomizer extending into the firebox and arranged to direct a stream of atomized oil downwardly and into the stream of air flowing upwardly through the opening in the bottom of the firebox.

6. Means for burning oil, comprising a firebox having a flue at the top and having a bottom provided with a central opening of less diameter than the firebox for the admission of air, a pile of refractory material covering said opening through which the air passes, and an oil atomizer arranged in said fire-box and directing a stream of atomized oil downwardly against the refractory material and into the stream of air flowing upwardly therethrough.

ARTHUR P. HOLDEN.
PHILIP MORGAN.